(12) United States Patent
Toyoda et al.

(10) Patent No.: US 7,539,510 B2
(45) Date of Patent: May 26, 2009

(54) COMMUNICATION APPARATUS AND PORTABLE TELEPHONE

(75) Inventors: Junichi Toyoda, Tokyo (JP); Katsumi Okayama, Kanagawa (JP); Sakan Iwashita, Kanagawa (JP); Yoshiki Kanayama, Saitama (JP); Hiroki Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 637 days.

(21) Appl. No.: 09/876,411

(22) Filed: Jun. 7, 2001

(65) Prior Publication Data

US 2001/0053673 A1 Dec. 20, 2001

(30) Foreign Application Priority Data

Jun. 7, 2000 (JP) .................. P2000-175573

(51) Int. Cl.
*H04M 1/00* (2006.01)
*H04B 1/38* (2006.01)
*H01Q 1/24* (2006.01)

(52) U.S. Cl. .................. 455/550.1; 455/90.1; 455/90.3; 455/562.1; 455/575.1; 455/575.7; 343/702

(58) Field of Classification Search .................. 455/90, 455/575.7, 90.2, 90.1, 550.1, 562.1, 575.1, 455/90.3, 272; 343/702, 895, 718, 899, 906, 343/841; 361/692; 342/1, 3; 368/10; 174/391, 174/384

See application file for complete search history.

(56) References Cited

U.S. PATENT DOCUMENTS

| | | | | |
|---|---|---|---|---|
| 4,847,818 A | * | 7/1989 | Olsen | .......... 368/10 |
| 4,879,065 A | | 11/1989 | Sterzel | |
| 5,170,173 A | * | 12/1992 | Krenz et al. | .......... 343/702 |
| 5,214,432 A | * | 5/1993 | Kasevich et al. | .......... 342/3 |
| 5,223,849 A | * | 6/1993 | Kasevich et al. | .......... 343/895 |

(Continued)

FOREIGN PATENT DOCUMENTS

DE  298 12 411 U  10/1998

(Continued)

OTHER PUBLICATIONS

Wang et al.,"SAR Reduction & Antenna Performance Guarentee by Suppression of Suface Currents on Portable Telephones", Journal of Magnetic Society of Japan, vol. 23, No. 10, pp. 2005-2008, (1999).

*Primary Examiner*—Thjuan K Addy
(74) *Attorney, Agent, or Firm*—Robert J. Depke; Rockey, Depke & Lyons, LLC.

(57) ABSTRACT

A portable telephone having an antenna for transmitting and/or receiving a wireless signal, a microphone for generating a sound signal corresponding to an input sound, a transmitting and receiving circuit for generating a wireless signal corresponding to the sound signal generated by the microphone to transmit the wireless signal through the antenna and generating a sound signal corresponding to the wireless signal received by the antenna, a receiver for outputting sound corresponding to the sound signal generated by the transmitting and receiving circuit, a shield case for surrounding and housing all or part of the transmitting and receiving circuit and being conductive, an electric wave absorber with one face in contact with a predetermined area of the shield case for absorbing an electric wave, and a conductive layer formed on another face of the electric wave absorber and electrically connected to the shield case.

22 Claims, 5 Drawing Sheets

U.S. PATENT DOCUMENTS

| | | | | |
|---|---|---|---|---|
| 5,374,779 A | * | 12/1994 | Konishi | 174/384 |
| 5,392,461 A | * | 2/1995 | Yokoyama | 455/90.2 |
| 5,539,148 A | * | 7/1996 | Konishi et al. | 174/391 |
| 5,710,987 A | * | 1/1998 | Paulick | 455/575.7 |
| 5,740,527 A | | 4/1998 | Mitama | |
| 6,057,796 A | * | 5/2000 | Kotsuka | 342/1 |
| 6,288,682 B1 | * | 9/2001 | Thiel et al. | 343/702 |
| 6,532,152 B1 | * | 3/2003 | White et al. | 361/692 |

FOREIGN PATENT DOCUMENTS

| | | |
|---|---|---|
| DE | 298 12 411 U | 10/1998 |
| EP | 0 522 538 A | 1/1993 |
| EP | A-0 522 538 | 1/1993 |
| EP | 0 727 932 A | 8/1996 |
| EP | A-0-727 932 | 8/1996 |

* cited by examiner

COMMUNICATION APPARATUS AND PORTABLE TELEPHONE

BACKGROUND OF THE INVENTION

1. Field of the Invention

The present invention relates to a communication apparatus and a portable telephone.

2. Description of the Related Art

In recent years, guidelines on local absorption covering communication apparatuses and portable telephones have been established in many countries. As the quantity for evaluation of local absorption, for example, there is the SAR (specific absorption rate) indicating the power of the electromagnetic energy absorbed per unit mass. For example, the Japanese guidelines on local absorption stipulate that the peak value of the average SAR for 10 g of tissue not exceed 2W/kg.

In "Decrease of Local SAR and Ensuring of Communication Characteristics by Control of Current at Surface of Housing of Portable Telephone" (Journal of Magnetics Society of Japan, Vol. 23, No. 10, pp. 2005-2008, (1999)), it is described to decrease the local SAR by attaching a ferrite sheet to a metal housing of a portable telephone.

The SAR has a tendency of becoming higher the larger the transmitting output of the communication apparatus and portable telephone and of becoming higher the closer the distance between the source of the electric wave of the communication apparatus and portable telephone and the human body.

In a portable telephone, the position where the SAR (local SAR) becomes the highest sometimes becomes a portion other than the antenna, for example, the vicinity of the shield case. This is derived from the fact that the shield case acts as part of the antenna and that the shield case is brought closer to the human head than the antenna at the time of a call.

In such case, the SAR can be decreased by attaching an electric wave absorber to the shield case of the portable telephone, more concretely, by attaching a sheet-type electric wave absorber on the human head side of the shield case by using an insulating adhesive, however, it is desirable to further decrease the SAR.

SUMMARY OF THE INVENTION

An object of the present invention is to provide a communication apparatus which can decrease the electromagnetic energy emitted to the human head from the inside of the portable telephone.

Another object of the present invention is to provide a portable telephone which can decrease the electromagnetic energy emitted to the human head from the inside of the portable telephone.

According to a first aspect of the present invention, there is provided a communication apparatus comprising an antenna for transmitting and/or receiving a wireless signal, an input and output means for receiving as input a signal from a user apparatus and/or outputting a signal to the user apparatus, a signal processing circuit for generating a wireless signal corresponding to the signal input by the input and/or output means and transmitting the wireless signal through the antenna and generating a signal corresponding to the wireless signal received by the antenna and outputting the signal through the input and/or output means, a conductive case for surrounding and housing all or part of the signal processing circuit, an electric wave absorber with one surface in contact with a predetermined area of the conductive case for absorbing an electric wave, and a conductive layer formed on another surface of the electric wave absorber and electrically connected to the conductive case.

Preferably, the electric wave absorber and the conductive layer are arranged between the conductive case and the input and/or output means for input and/or output of the signal with the user apparatus.

According to a second aspect of the present invention, there is provided a portable telephone, comprising an antenna for transmitting and/or receiving a wireless signal, a transmitter for generating a sound signal corresponding to an input sound, a transmitting and receiving circuit for generating a wireless signal in response to the sound signal generated by the transmitter to transmit the wireless signal through the antenna and generating a sound signal corresponding to the wireless signal received by the antenna, a receiver for outputting a sound corresponding to the sound signal generated by the transmitting and receiving circuit, a shield case for surrounding and housing all or part of the transmitting and receiving circuit and being conductive, an electric wave absorber with one surface in contact with a predetermined area of the shield case for absorbing an electric wave, and a conductive layer formed on another surface of the electric wave absorber and electrically connected to the shield case.

Specifically, the transmitting and receiving circuit comprises a transmitting circuit for generating a wireless signal corresponding the sound signal from the microphone and transmitting the wireless signal through the antenna, a receiving circuit for generating a sound signal in response to the wireless signal received by the antenna and outputting the sound signal to the receiver, and a printed circuit board mounting the transmitting circuit and the receiving circuit, and the shield case surrounds and houses all or part of the transmitting and receiving circuit to prevent electromagnetic interference between the transmitting and receiving circuit and the antenna.

Further preferably, the electric wave absorber is arranged at the area at the surface of the shield case close to the human head at the time of a call.

Still more preferably, the electric wave absorber is closely bonded to that area of the shield case.

Specifically, the conductive layer includes a metal film formed on another face of the electric wave absorber.

Specifically, the conductive layer and the shield case are connected by metal wiring.

Further specifically, the conductive layer comprises a metal plate fixed to the shield case at a predetermined interval from and in parallel to the surface of the shield case and the electric wave absorber is formed by inserting a predetermined member between the surface of the shield case and the metal plate.

Specifically, the electric wave absorber includes a magnetic loss material.

Further specifically, the electric wave absorber is a part shaped from a mixture of the magnetic loss material and a synthetic resin.

Preferably, a portable telephone according to the present intention further comprises a switching circuit mounted among the transmitting circuit, the receiving circuit, and the antenna on the printed circuit board for supplying the wireless signal from the transmitting circuit to the antenna and supplying the wireless signal from the antenna to the receiving circuit and a feeder for connecting the switching circuit and the antenna, and the electric wave absorber is closely bonded to a portion at the area of the shield case located between the feeder and the receiver.

Specifically, the shield case has a case made of an insulating material and a conductive layer formed on the surface of the case, and the conductive layer is connected to a layer of a ground level voltage of the printed circuit board.

Further specifically, the shield case is made of a conductive material and is connected to a layer of a ground level voltage of the printed circuit board.

Preferably, the portable telephone according to the present invention further comprises a housing made of an insulating material for housing the transmitting and receiving circuit, the shield case, the electric wave absorber, the microphone, and the receiver; the receiver is arranged in the vicinity of one end of the housing; the microphone is arranged in the vicinity of another end of the housing; and the antenna is a retractable antenna able to be extended from one end in the longitudinal direction of the housing.

In the communication apparatus and portable telephone according to the present invention, first, the shield case prevents the electromagnetic interference between the signal processing circuit or the transmitting and receiving circuit and antenna because the surface of the shield case is conductive.

Further, since the electric wave absorber is closely arranged at the surface of the shield case, for example closely bonded to an area located on the human head side at the time of a call, it is possible to make the electric wave absorber absorb the electromagnetic energy and therefore possible to decrease the SAR.

Still further, since the conductive layer connected to the surface of the shield case is formed on the surface of the electric wave absorber, when the electric wave emitted from the surface of the shield case penetrates the electric wave absorber, the penetrating electric wave can be absorbed in the conductive layer, so that it is possible to increase the amount of reduction of the SAR.

BRIEF DESCRIPTION OF THE DRAWINGS

These and other objects and features of the present invention will become more apparent from the following description of the preferred embodiments given with reference to the accompanying drawings, in which.

DESCRIPTION OF THE PREFERRED EMBODIMENTS

Preferred embodiments will be described with reference to the accompanying drawings.

First, for reference purposes, the configuration of a portable telephone according to the related art will be described with reference to FIGS. 1 and 2.

Figure 1:
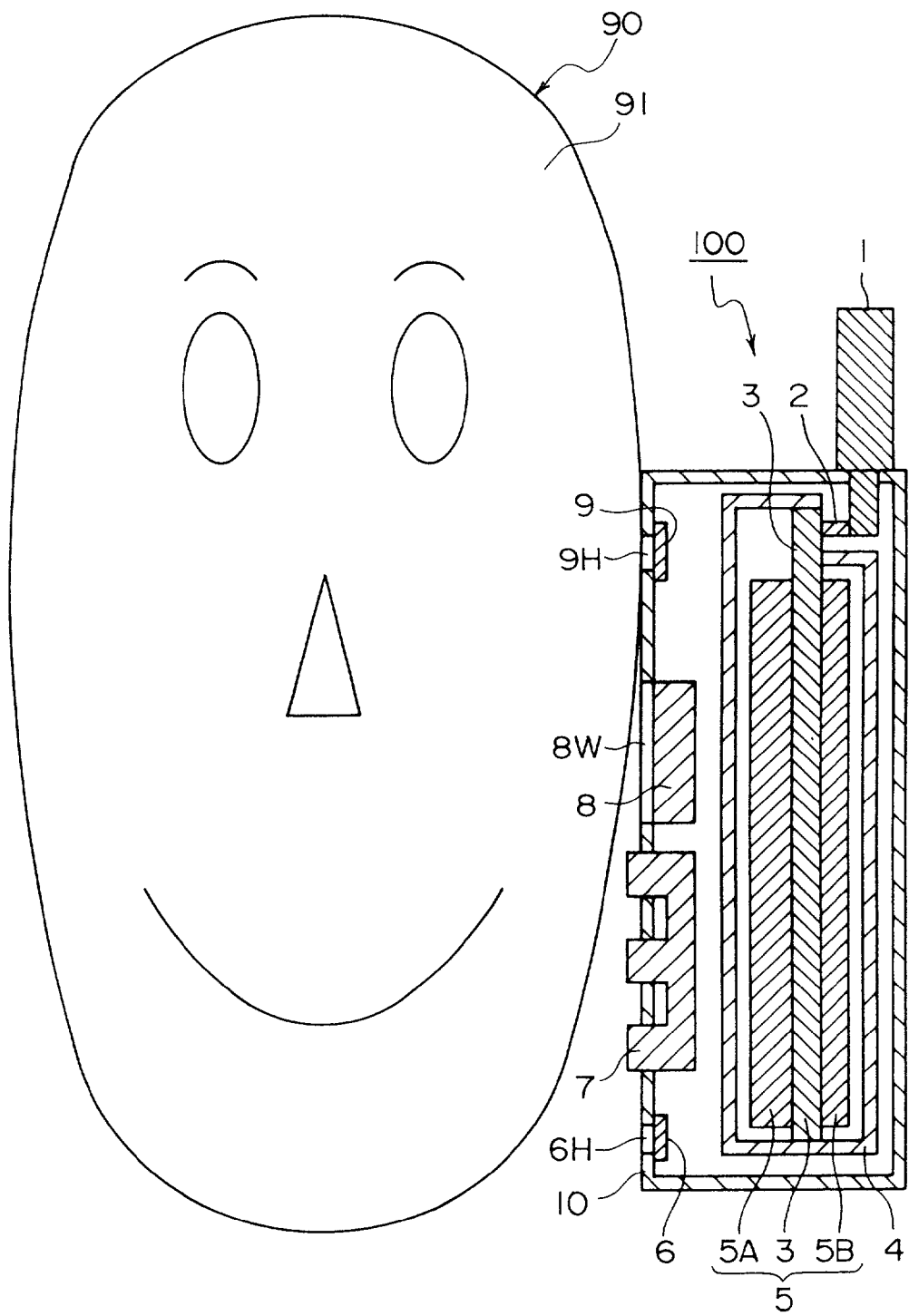
FIG. 1 is a schematic view of the configuration of an example of a portable telephone.

FIG. 1 is a schematic view of the configuration of a portable telephone. This portable telephone 100 contacts a head 91 (human head) of a user 90 of the portable telephone 100.

The portable telephone 100 comprises an antenna 1, a feeder 2, a printed board 3, a shield case 4, parts 5A and 5B, a microphone 6, a key pad 7, a liquid crystal display 8, a receiver 9, and an insulating housing 10.

The transmission and reception antenna 1 projects from the top end of the housing 10, transmits an electric wave to a base station at the time of the transmission, and receives an electric wave from the base station at the time of reception.

This antenna 1 is a retractable antenna able to extend in the longitudinal direction of the housing 10.

On one surface of the printed board 3 are mounted parts 5A including for example a semiconductor integrated circuit (IC), transistors, capacitors, resistors, and so on.

On the other surface of the printed board 3 are mounted parts 5B including for example an IC, transistors, capacitors, resistors, and so on.

The printed circuit board 5 is comprised by the printed board 3 and parts 5A and 5B. A switching circuit, a control circuit, a transmitting circuit, and a receiving circuit are mounted on the printed circuit board 5. The transmitting circuit and the receiving circuit are connected to the antenna 1 through the switching circuit and the feeder 2.

The housing 10 comprises a hole 6H for the microphone 6, a hole 9H for the receiver 9, a window 8W for the liquid crystal display 8, and so on. The hole 6H is a microphone opening, while the hole 9H is a receiver opening.

The housing 10 houses the printed circuit board 5, the shield case 4, the microphone 6, and the receiver 9.

The user 90 can view the display on the liquid crystal display 8 through the window 8W.

The user 90 can listen to the output sound from the receiver 9 through the hole 9H.

The sound the user 90 makes is supplied to the microphone 6 through the hole 6H. The microphone 6 receives the sound such as the sound made by the user 90 and generates a first sound signal corresponding to the sound.

The printed circuit board 5 converts the first sound signal to a first wireless signal. The first wireless signal is transmitted from the antenna 1 to the base station. This base station transmits a second wireless signal to the portable telephone 100.

The printed circuit board 5 converts the second wireless signal input to the antenna 1 to a second sound signal and supplies it to the receiver 9. The receiver 9 outputs a sound corresponding to the second sound signal and supplies the sound to the ear of the user 90.

Note that circuits such as the printed circuit board 5, the microphone 6, the receiver 9, and the liquid crystal display 8 are supplied with drive power from a not shown drive power supply in the portable telephone 100 (for example, a dry cell or a battery).

The key pad 7 has dial buttons or a tenkey pad. The key pad 7 is input with information such as a telephone number by the user 90.

The liquid crystal display 8 displays various information. For example, it displays a telephone number input from the key pad 7.

The shield case 4 is connected to a ground layer of the printed circuit board 5 and surrounds the printed circuit board 5 to suppress electromagnetic interference between the printed circuit board 5 and the antenna 1. The surface of the shield case 4 is conductive.

Figure 2:
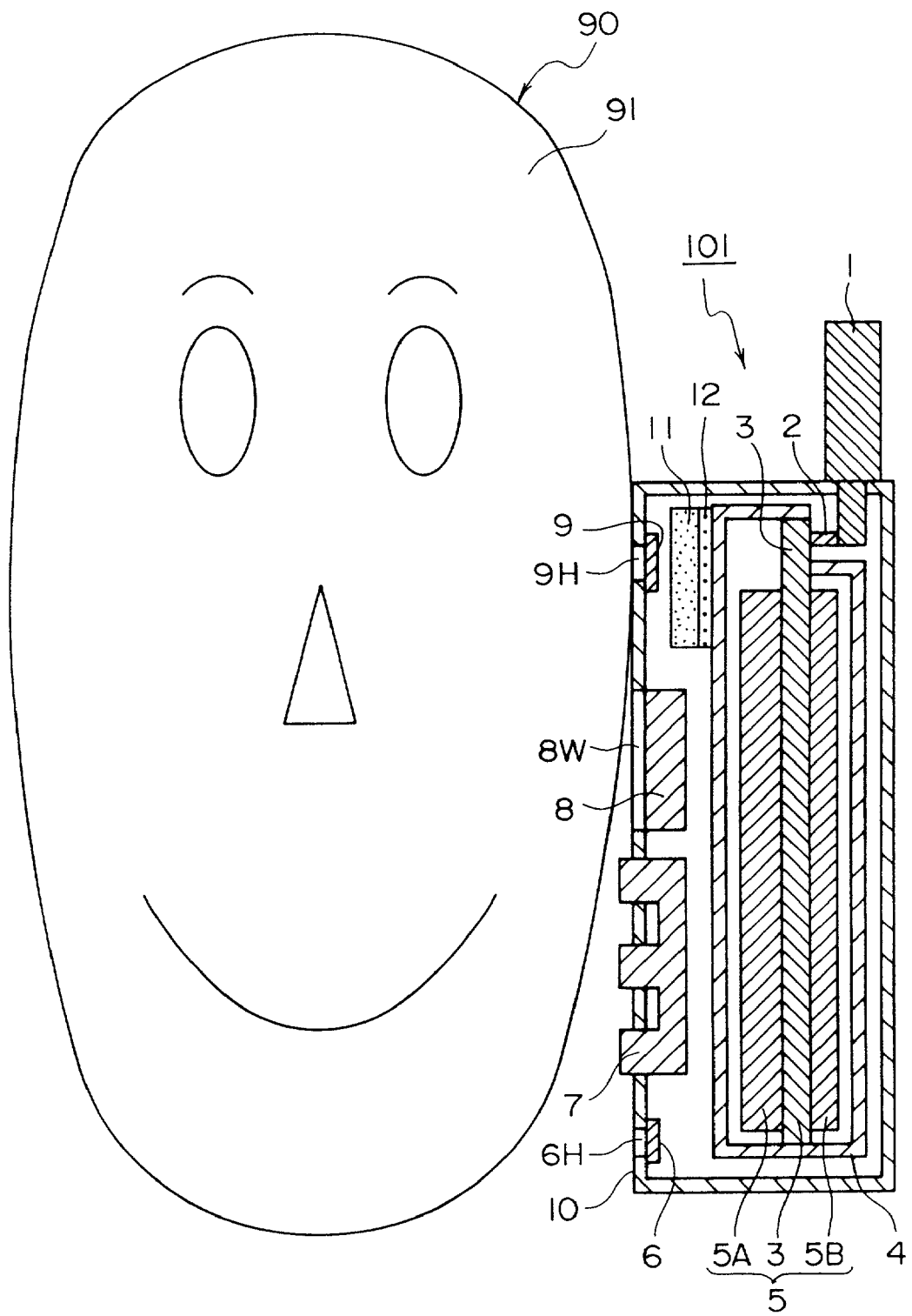
FIG. 2 is a schematic view for explaining a portable telephone comprised of the portable telephone shown in FIG. 1 plus an electric wave absorber.

FIG. 2 is a schematic view for explaining a portable telephone 101 comprised of the portable telephone 100 shown in FIG. 1 plus an electric wave absorber. Note that, in the portable telephone 101, the same portions as the portable telephone 100 shown in FIG. 1 are given the same references and the explanation of the same portions are suitably omitted.

In this portable telephone 101, a sheet-type electric wave absorber 11 is attached to the side of the shield case 4 facing the human head 91 by an insulating adhesive 12. The insulating adhesive 12 is an adhesive made of for example a synthetic resin.

The SAR can be decreased by attaching an electric wave absorber 11 to the shield case 4 such as in the portable telephone 101, however it is desirable to further decrease the SAR.

Below, embodiments of the present invention will be described with reference to the accompanying drawings.

Figure 3:
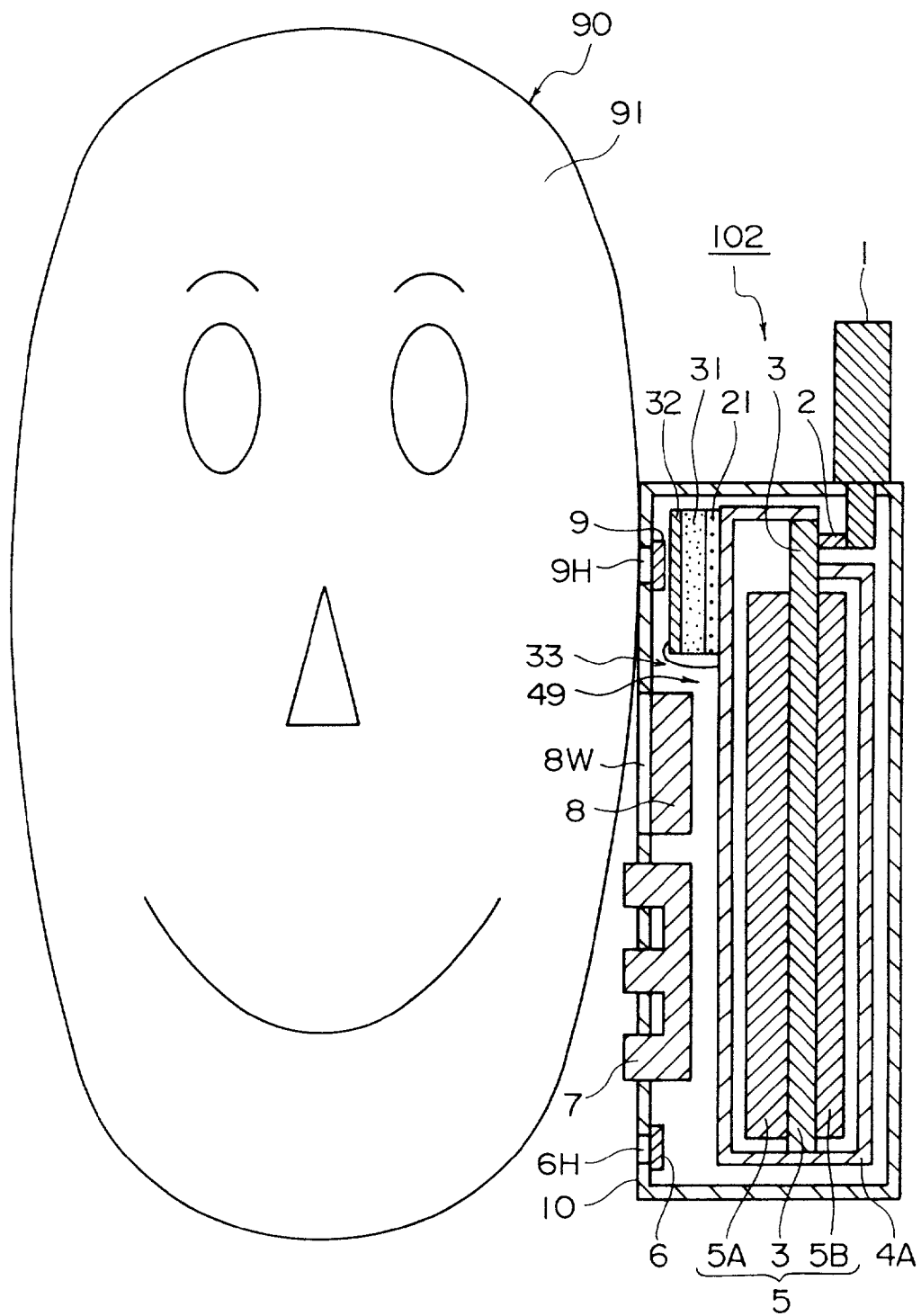
FIG. 3 is a schematic view of the configuration of a portable telephone of a first embodiment according to the present invention.

FIG. 3 is a schematic view of the configuration of a portable telephone of a first embodiment according to the present invention. This portable telephone 102 contacts a head 91 (head of a human body) of the user 90 of the portable telephone 102.

The portable telephone 102 comprises an antenna 1, a feeder 2, a printed board 3, a shield case 4A, parts 5A and 5B, a microphone 6, a key pad 7, a liquid crystal display 8, a receiver 9, an electric wave absorber 31, an insulating housing 10, and a conductive layer 32. The dimension of the housing 10 in the longitudinal direction is made about 12 cm as an example.

The transmission and reception antenna 1 transmits an electric wave to a base station at the time of transmission and receives an electric wave from the base station at the time of reception.

The antenna 1 is a retractable antenna able to extend from one end of the housing 10 in the longitudinal direction of the housing 10.

On one surface of the printed board 3, parts 5A including for example a semiconductor integrated circuit (IC), transistors, capacitors, resistors, and so on are mounted.

On another surface of the printed board 3, parts 5B including for example an IC, transistors, capacitors, resistors, and so on are mounted.

The printed circuit board 5 is comprised by the printed board 3 and parts 5A and 5B. A switching circuit (SW), a control circuit (CNT), a transmitting circuit (TRS), and a receiving circuit (RCV) are mounted on the printed circuit board 5. The transmitting circuit and the receiving circuit are connected to the antenna 1 through the switching circuit and the feeder 2.

The housing 10 houses the printed circuit board 5, the shield case 4A, the electric wave absorber 31, the microphone 6, and the receiver 9.

A receiver 9 is arranged in the vicinity of one end of the housing 10.

A microphone 6 is arranged in the vicinity of another end of the housing 10.

The housing 10 comprises a hole 6H for the microphone 6, a hole 9H for the receiver 9, a window 8W for the liquid crystal display 8, and so on. The hole 6H is a microphone opening, and the hole 9H is a receiver opening.

The user 90 can view the display on the liquid crystal display 8 through the window 8W.

The user 90 can listen to the sound output from the receiver 9 through the hole 9H.

The sound the user 90 makes is supplied to the microphone 6 through the hole 6H. The microphone 6 receives sound such as the sound made by the user 90 and generates a first sound signal corresponding to the sound.

The printed circuit board 5 converts the first sound signal to a first wireless signal. The first wireless signal is transmitted from the antenna 1 to the base station. This base station transmits a second wireless signal to the portable telephone 100.

The printed circuit board 5 converts the second wireless signal input to the antenna 1 to a second sound signal and supplies it to the receiver 9. The receiver 9 outputs a sound corresponding to the second sound signal and supplies it to the ear of the user 90. For example, the frequency of the first and/or second wireless signal may be about 800 MHZ or about 900 MHZ and may be about 1.8 GHz or about 2 GHz.

Note that the circuits such as the printed circuit board 5, the microphone 6, the receiver 9, and the liquid crystal display 8 are supplied with drive power from a not shown drive use power supply in the portable telephone 100 (for example a battery).

The key pad 7 comprises dial buttons or a tenkey pad. The key pad 7 receives information such as a telephone number from the user 90.

The liquid crystal display 8 displays various information. For example, it displays the telephone number input from the key pad 7.

The shield case 4A is connected to the ground layer of the printed circuit board 5 and surrounds the printed circuit board 5 so as to suppress electromagnetic interference between the printed circuit board 5 and the antenna 1. The surface of the shield case 4A is conductive.

For example, the shield case 4A may have a case made of an insulating material and a conductive layer formed on the surface of the case, and the conductive layer may be connected to the ground layer of the printed circuit board 5. As an example, it is possible to plate a metal such as nickel on a plastic case to form a shield case 4A having a conductive layer formed by the metal plating.

The shield case 4A may be made of a conductive material and may be for example a metal case.

An electric wave absorber 31 is closely bonded to the head side area 49 located at the head 91 side of the outside surface of the shield case 4A at the time of a call. One surface of the electric wave absorber 31 is closely bonded to the head side area 49 of the shield case 4A by an adhesive 21. The bonding surface of the electric wave absorber 31 is shaped to correspond to the surface of the shield case 4A and can be closely bonded to the head side area 49 of the shield case 4A.

Further, another surface facing one surface (bonding side) of the electric wave absorber 31 is in contact with the conductive layer 32. Metal wiring 33 is connected to the surface of the conductive layer 32 and the surface of the shield case 4A. For example, the conductive layer 32 may be a metal film of a constant or approximately constant thickness formed on the other surface of the electric wave absorber 31. This metal film may be formed by plating copper, aluminum, or nickel.

The electric wave absorber 31 includes a magnetic loss material. The magnetic loss material is for example comprised of ferrite, Permalloy, sendust, stainless steel (stainless steel alloy), silicon steel, an iron-based amorphous alloy, a magnetic material, a magnetic alloy, and so on.

The electric wave absorber 31 may be a part formed by mixing an insulating polymer compound such as a polyamide-based synthetic polymer material, chlorinated polyethylene, silicone resin, phenol resin, and epoxy resin with a powder of the magnetic loss material and curing the mixture in a desired shape. The insulating polymer compound may be used as a binder material.

As an example, the electric wave absorber 31 may be a part formed by adding a powder of a magnetic loss material to a synthetic resin and kneading them or adding a synthetic resin to a powder of a magnetic loss material and kneading them and then shaping it. Note that the powder may be of a flat shape.

Further, for example sintering material fabricated by carrying out the press forming to the powder of ferrite, may be used as the electric wave absorber 31.

In the portable telephone 102, the dimension of the housing 10 in the longitudinal direction is smaller than the wavelength of a wireless signal used for the wireless communication. The shield case 4A also works as part of the antenna. Namely, due to the electric power supplied to the antenna 1, current flows at the surface of the shield case 4A and the surface is excited.

In the portable telephone 102, the electric wave absorber 31 is closely bonded at the middle area located between the receiver 9 and its vicinity and the feeder 2 and its vicinity in the head side area 49 of the shield case 4A.

Alternatively, the electric wave absorber 31 is closely bonded at the middle area located between the receiver opening 9H and its vicinity and the feeder 2 and its vicinity in the head side area 49 of the shield case 4A.

By closely arranging the electric wave absorber 31 in the middle area, the electromagnetic energy emitted from the middle area or the feeder 2 or its vicinity to the human head 91 can be absorbed by the electric wave absorber 31.

Further, in the portable telephone 102, since the conductive layer 32 connected to the surface of the shield case 4A is in contact with the surface of the electric wave absorber 31, when the electric wave emitted from the surface of shield case 4A penetrates the electric wave absorber 31, the penetrating electric wave can be absorbed in the electric conductive layer 32 and the amount of reduction of the SAR can be increased.

Figure 4:
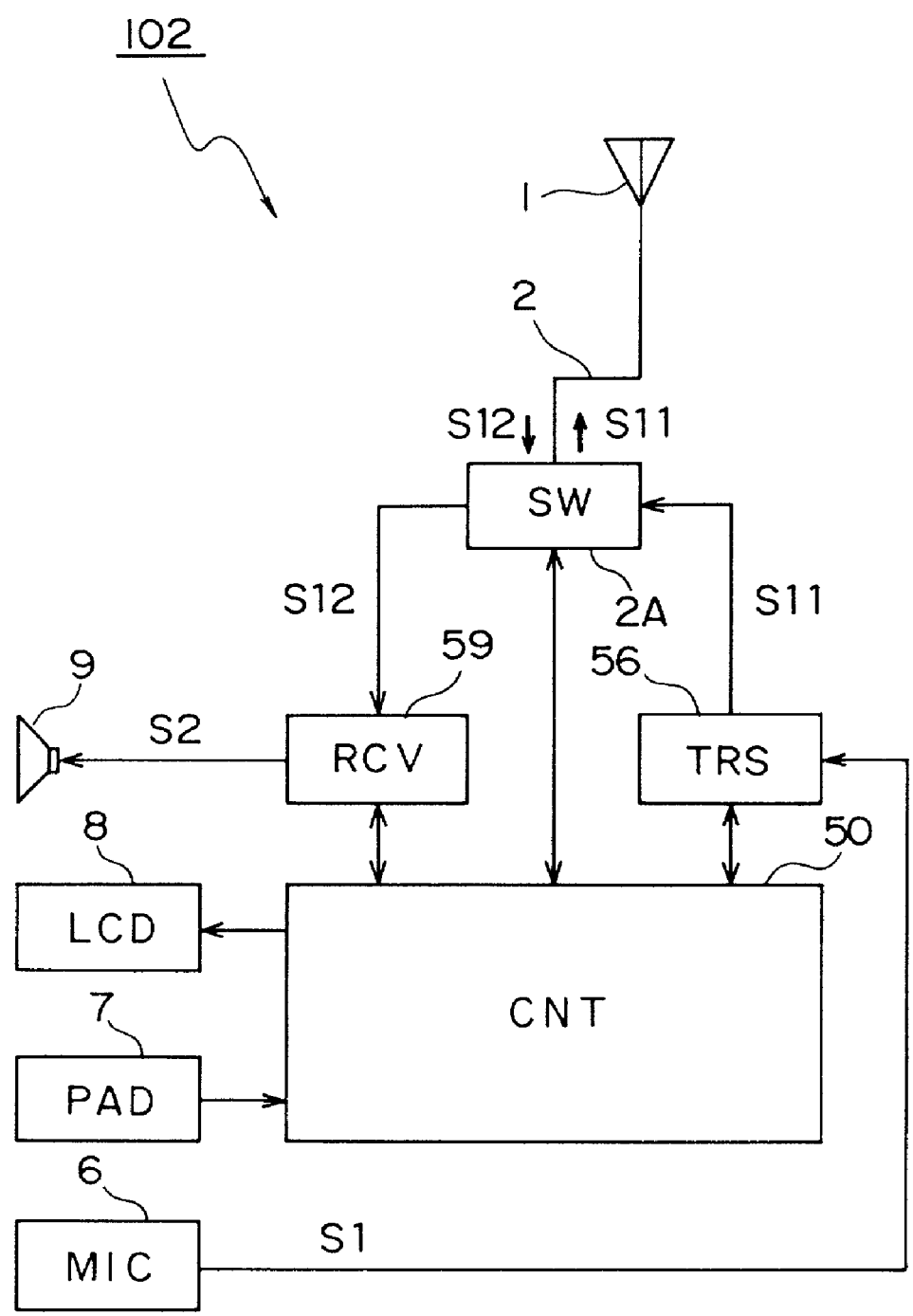
FIG. 4 is a schematic block diagram of the configuration of the portable telephone shown in FIG. 3.

FIG. 4 is a schematic block diagram of the configuration of the portable telephone 102 shown in FIG. 3.

In the portable telephone 102 shown in FIG. 4, the switching circuit (SW) 2A, the control circuit (CNT) 50, the transmitting circuit (TRS) 56, and the receiving circuit (RCV) 59 are comprised by the parts 5A and 5B and the printed board 3 shown in FIG. 3 and are mounted on the printed circuit board 5 shown in FIG. 3.

The sound made by the user 90 is input to the microphone (MIC) 6. The input sound is converted to an electric signal to generate a first sound signal S1 corresponding to the input sound.

A transmitting circuit 56 modulates the first sound signal S1 to convert it to a first wireless signal S11 and outputs this first wireless signal S11 to the switching circuit 2A.

The switching circuit 2A supplies the first wireless signal S11 from the transmitting circuit 56 to the antenna 1 through the feeder 2. The antenna 1 converts the first wireless signal S11 from an electric signal to an electric wave and transmits the electric wave to the base station.

The antenna 1 receives a second wireless signal S12 including the modulated second sound signal S2 and supplies the second wireless signal S12 to the switching circuit 2A through the feeder 2.

The switching circuit 2A supplies the wireless signal S12 from the antenna 1 to the receiving circuit 59.

The receiving circuit 59 demodulates the second wireless signal S12 to generate a second sound signal S2 and outputs the second sound signal S2 to the receiver 9.

The receiver 9 converts the second sound signal S2 to output sound corresponding to the second sound signal and supplies the output sound to the ear of the user 90.

The control circuit 50 is a controller for controlling the entire portable telephone 102 and controls the transmitting circuit 56, the receiving circuit 59, the switching circuit 2A, and the liquid crystal display 8.

Further, the control circuit 50 controls the transmission/reception sequential operation, controls the transmission/reception protocol, and is comprised of for example a microcomputer.

The key pad 7 supplies the input information input to the key pad 7 to the control circuit 50. The control circuit 50 performs various signal processing based on the input information from the key pad 7. The control circuit 50 controls the display of the liquid crystal display 8 to for example, make the liquid crystal display 8 display the input information from the key pad 7 on the display screen of the liquid crystal display 8.

Figure 5:
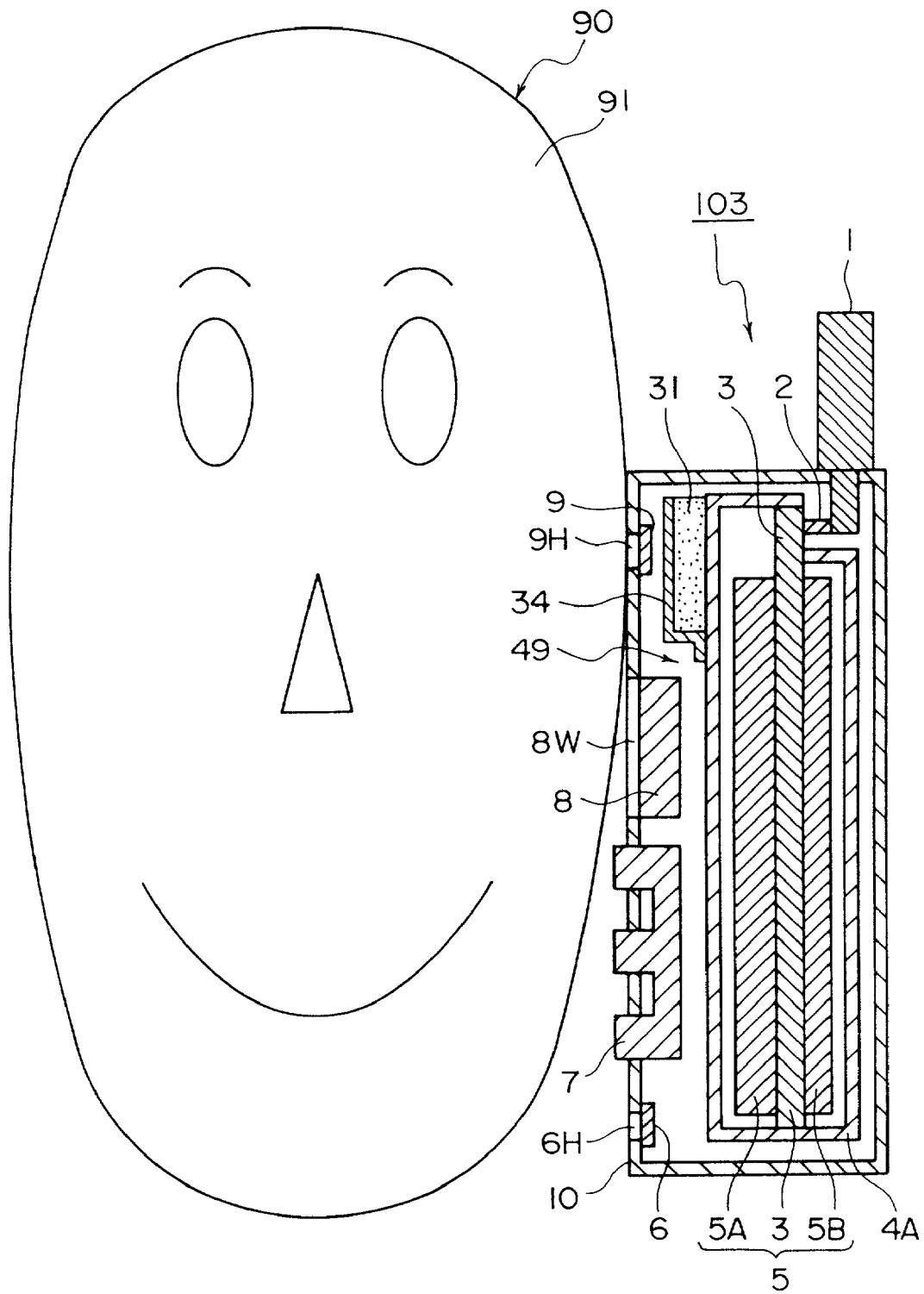
FIG. 5 is a schematic view of the configuration of a portable telephone of a second embodiment according to the present invention.

FIG. 5 is a schematic view of the configuration of a portable telephone of a second embodiment according to the present invention. This portable telephone 103 contacts the head 91 (head of human body) of the user 90 of the portable telephone 103. Note that, the same portions as the portable telephone 102 shown in FIG. 3 are given the same references and the explanation of the same portions are suitably omitted.

When the portable telephone 103 is compared with the portable telephone 102 shown in FIG. 3, the method for installing the electric wave absorber 31 differs from that of the portable telephone 102. In the portable telephone 103 shown in FIG. 5, the electric wave absorber 31 is sandwiched between a conductive layer 31 formed by a metal plate and the shield case 4A.

The portable telephone 103 comprises the antenna 1, the feeder 2, the printed board 3, the shield case 4A, the parts 5A and 5B, the microphone 6, the liquid crystal display 8, the receiver 9, the electric wave absorber 31, the insulating housing 10, and the conductive layer 34.

One surface of the electric wave absorber 31 is closely bonded to the head side area 49 of the surface outside of the shield case 4A locating at the side of the human head 91 at the time of a call. The bonding surface of the electric wave absorber 31 is shaped to correspond to the surface of the shield case 4A and can be closely bonded to the head side area 49 of the shield case 4A.

The conductive layer 34 is in contact with the other surface facing that surface (bonding surface) of the electric wave absorber 31. The conductive layer 34 is a metal plate fixed on the surface of the shield case 4A. The electric wave absorber 31 is held sandwiched between the surface of the shield case 4A and the metal plate.

In the portable telephone 103, the electric wave absorber 31 is closely bonded at the middle area at the head side area 49 of the shield case 4A located between the receiver 9 and its vicinity and the feeder 2 and its vicinity.

Alternatively, the electric wave absorber 31 is closely bonded at the middle area of the head side area 49 of the shield case 4A located between the receiving opening 9H and its vicinity and the feeder 2 and its vicinity.

By closely arranging the electric wave absorber 31 at the middle area, the electromagnetic energy emitted from the middle area or the feeder 2 or its vicinity to the human head 91 side can be absorbed by the electric wave absorber 31.

Further, in the portable telephone 102, since the conductive layer 34 connected to the surface of the shield case 4A is in contact with the surface of the electric wave absorber 31, when the electric wave emitted from the surface of shield case 4A penetrates the electric wave absorber 31, the penetrating electric wave can be absorbed in the electric conductive layer 34 and the amount of reduction of the SAR can be increased.

Note that, the electric wave absorber 31 is for example a rectangular parallelepiped or an approximately rectangular parallelepiped in which, as an example, the dimension of the length and breadth of the rectangular parallelepiped may be about 1 cm to about 4 cm (or about 2 cm to about 3 cm) and the thickness may be about 1 mm to about 4 mm (or about 2 mm to about 3 mm).

Further, the embodiments mentioned above are examples of the present invention. The present invention is not limited to the above embodiments.

Summarizing the effects of the invention, as described above, according to the communication apparatus and the portable telephone according to the present invention, it is possible to increase the amount of reduction of the SAR by a conductive layer in contact with the surface of the electric wave absorber.

As the result, a communication apparatus and a portable telephone which can decrease the electromagnetic energy emitted from the inside of the communication apparatus or portable telephone toward the human head can be provided.

While the invention has been described with reference to specific embodiment chosen for purpose of illustration, it should be apparent that numerous modifications could be made thereto by those skilled in the art without departing from the basic concept and scope of the invention.

What is claimed is:

1. A communication apparatus comprising: an antenna for transmitting and/or receiving a wireless signal, a signal processing circuit for processing a signal corresponding to a wireless signal received by the antenna, a conductive case surrounding and housing all or part of the signal processing circuit, an electro-magnetic wave absorber permanently affixed with one surface adjacent a predetermined area of the conductive case for absorbing electro-magnetic waves emitted from the conductive case in a direction of a user and thereby reducing electro-magnetic waves reaching the user of the communication apparatus, a conductive member provided at another surface of the electro-magnetic wave absorber and being electrically connected to the conductive case, and further wherein the electro-magnetic wave absorber is physically located between a speaker of the communication apparatus and the conductive case, the conductive member being located closest to the speaker further comprising an outer housing separate from said conductive case, which surrounds and confines said conductive case, said electro-magnetic wave absorber, a microphone, said signal processing circuit, and said conductive member; and wherein said electro-magnetic wave absorber is permanently secured to a fixed position at a side of the conductive case.

2. A communication apparatus as set forth in claim 1, wherein said electro-magnetic wave absorber and said conductive member are arranged between said conductive case and a head of a user of the communication apparatus.

3. A portable telephone comprising: an antenna for transmitting and/or receiving a wireless signal; a microphone for generating a sound signal corresponding to an input sound; a circuit for generating a wireless signal corresponding to said sound signal generated by said microphone; a conductive shield case surrounding and housing all or part of said circuit; an electro-magnetic wave absorber permanently affixed with one surface in contact with a predetermined area of the conductive shield case for absorbing electro-magnetic waves emitted from the conductive shield case in a direction of a user and thereby reducing the amount of electro-magnetic waves reaching the user of said telephone device; and a conductive member provided at another surface of the electro-magnetic wave absorber and being electrically connected to the conductive shield case, and further wherein the electro-magnetic wave absorber is physically located between a speaker of the portable telephone and the conductive shield case, the conductive member being located closest to the speaker and further comprising an outer housing separate from said conductive shield case, which surrounds and confines said conductive shield case, said electro-magnetic wave absorber, said microphone, said circuit, and said conductive member; and wherein said electro-magnetic wave absorber is permanently secured to a fixed position at a side of the conductive shield case.

4. A portable telephone as set forth in claim 3, wherein said circuit comprises:
a transmitting circuit for generating a wireless signal corresponding to a sound signal from the microphone,
a receiving circuit for generating a sound signal in response to a wireless signal received by the antenna and outputting the sound signal, and
a printed circuit board containing the transmitting circuit and the receiving circuit, and wherein
the shield case surrounds and houses the transmitting and receiving circuits and the printed circuit board to prevent electromagnetic interference between the transmitting and receiving circuits and the antenna.

5. A portable telephone as set forth in claim 3, wherein said electro-magnetic wave absorber is arranged at an area at a surface of said shield case close to a head of a user of the portable telephone at the time of a call.

6. A portable telephone as set forth in claim 3, wherein said electro-magnetic wave absorber is closely bonded to an area at a surface of said shield case close to a head of a user of the portable telephone at the time of a call.

7. A portable telephone as set forth in claim 3, wherein said conductive member and said shield case are connected by a metal wiring.

8. A portable telephone as set forth in claim 3, wherein
the conductive member comprises a metal plate fixed to the shield case and
the electro-magnetic wave absorber is formed by inserting a member between the surface of the shield case and the metal plate.

9. A portable telephone as set forth in claim 3, wherein said electro-magnetic wave absorber includes a magnetic loss material.

10. A portable telephone as set forth in claim 9, wherein said electromagnetic wave absorber is made in a desired shape from a mixture of said magnetic loss material and a synthetic resin.

11. A portable telephone as set forth in claim 4, further comprising
a switching circuit and a feeder on the printed circuit board for supplying the wireless signal from the transmitting circuit to the antenna and supplying the wireless signal from the antenna to the receiving circuit and
said feeder used for connecting the switching circuit and the antenna, and
the electro-magnetic wave absorber is closely bonded to a portion of the shield case located between the feeder and the receiving circuit.

12. A portable telephone as set forth in claim 3, wherein
said shield case is made of an insulating material and has a conductive layer formed on its surface and
said conductive layer is connected to a layer of a ground level voltage of said printed circuit board.

13. A portable telephone as set forth in claim 4, wherein said shield case is made of a conductive material and is connected to a layer of a ground level voltage of said printed circuit board.

14. A portable telephone as set forth in claim 4, further comprising an outer housing made of an insulating material for housing said transmitting and receiving circuit, said shield case, said electro-magnetic wave absorber, and said microphone, wherein said receiving circuit is arranged in the vicinity of one end of said housing, said microphone is arranged in the vicinity of another end of said housing, and said antenna is a retractable antenna able to extend from said one end in the longitudinal direction of said housing.

15. A portable telephone as set forth in claim 14, further comprising a switching circuit on said printed circuit board for supplying said wireless signal from said transmitting circuit to said antenna, and for supplying said wireless signal from said antenna to said receiving circuit and a feeder for connecting said switching circuit and said antenna, wherein said electro-magnetic wave absorber is closely bonded at the portion of said shield case located between said receiving circuit and said feeder.

16. The communication apparatus of claim 1, wherein the conductive member is electrically connected to a ground layer of the signal processing circuit.

17. The portable telephone of claim 3, wherein the conductive member is electrically connected to a ground layer of the circuit.

18. The communication apparatus of claim 1, wherein said antenna is provided substantially outside of said outer housing, and a feeder is formed within the outer housing for connecting said antenna and said signal processing circuit.

19. The communication apparatus of claim 1, wherein said conductive case surrounds substantially the entire signal processing circuit.

20. The portable telephone of claim 3, wherein said antenna is provided substantially outside of said outer housing, and a feeder is formed within the outer housing for connecting said antenna and said circuit.

21. The portable telephone of claim 3, wherein said conductive case surrounds substantially the entire signal processing circuit.

22. The communication apparatus of claim 1, wherein said electro-magnetic wave absorber includes a magnetic loss material.

* * * * *